US006807031B2

(12) United States Patent
Macken et al.

(10) Patent No.: US 6,807,031 B2
(45) Date of Patent: Oct. 19, 2004

(54) SINGLE DOMAIN STATE LAMINATED THIN FILM STRUCTURE FOR USE AS A MAGNETIC LAYER OF A TRANSDUCING HEAD

(75) Inventors: Declan Macken, Prior Lake, MN (US); Gavin Brinkley, Killea (IE); Taras Grigoryevich Pokhil, Arden Hills, MN (US); Alexandar Mikhailovich Shukh, Savage, MN (US); Martin Louis Plumer, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 106 days.

(21) Appl. No.: 10/190,182

(22) Filed: Jul. 3, 2002

(65) Prior Publication Data

US 2002/0181164 A1 Dec. 5, 2002

Related U.S. Application Data

(63) Continuation-in-part of application No. 09/649,984, filed on Aug. 29, 2000, now Pat. No. 6,437,949.
(60) Provisional application No. 60/353,674, filed on Jan. 31, 2002, and provisional application No. 60/181,116, filed on Feb. 8, 2000.

(51) Int. Cl.$^7$ .............................. G11B 5/39; G11B 5/31
(52) U.S. Cl. ...................................... 360/317; 360/126
(58) Field of Search ............................... 360/126, 317, 360/319

(56) References Cited

U.S. PATENT DOCUMENTS

| 4,103,315 A | 7/1978 | Hempstead et al. ......... 360/110 |
| 4,195,323 A | 3/1980 | Lee ............................ 360/126 |
| 4,447,839 A | 5/1984 | Desserre et al. ............ 324/210 |
| 4,814,921 A | 3/1989 | Hamakawa et al. ........ 360/126 |
| 5,032,945 A | 7/1991 | Argyle et al. ............... 360/125 |
| 5,108,837 A | * 4/1992 | Mallary ...................... 428/336 |
| 5,132,859 A | * 7/1992 | Andricacos et al. ........ 360/126 |
| 5,208,715 A | 5/1993 | Mowry ....................... 360/319 |
| 5,313,356 A | * 5/1994 | Ohkubo et al. ............. 360/126 |
| 5,465,185 A | 11/1995 | Heim et al. ............ 324/207.21 |
| 5,515,221 A | 5/1996 | Gill et al. .................... 360/319 |
| 5,621,592 A | 4/1997 | Gill et al. .................... 360/319 |
| 5,751,528 A | * 5/1998 | Nepela et al. .............. 360/126 |
| 5,761,011 A | 6/1998 | Miyauchi et al. ........... 360/319 |

(List continued on next page.)

OTHER PUBLICATIONS

"Magnetization and Switching Characteristics of Composite Thin Magnet Films" by E. Goto et al, *Journal of Applied Physics*, pp 10–17, vol. 36, No. 9, Sep. 1965.
"Interactions in Multilaver Magnet Films" by A. Yelon, *Physics of Thin Films*, vol. 6, Ch. 4, pp. 205–300, 1971.
"Micromagnetics of Laminated Permalloy Films" by J. Slonczewski et al., *IEEE Transactions on Magnetics*, vol. 24, No. 3, pp. 2–17,©1988.

* cited by examiner

*Primary Examiner*—David Ometz
(74) *Attorney, Agent, or Firm*—Kinney & Lange, P.A.

(57) ABSTRACT

A transducing head includes at least three magnetic layers. At least two of these magnetic layers function as shields of a reader portion of the transducing head, and at least one of these magnetic layers functions as a pole of a writer portion of the transducing head. Importantly, at least one of the three magnetic layers is formed of a thin film structure having a first and a second ferromagnetic layer, a nonmagnetic spacer layer, and a bias layer. The spacer layer is positioned between the first and the second ferromagnetic layers. The bias layer is positioned adjacent the first ferromagnetic layer. The second ferromagnetic layer has a thickness-magnetic moment product substantially equal to a thickness-magnetic moment product of the first ferromagnetic layer. An easy axis of the second ferromagnetic layer is substantially parallel to an easy axis of the first ferromagnetic layer.

21 Claims, 5 Drawing Sheets

| | | | |
|---|---|---|---|
| 5,805,392 A | | 9/1998 | Mallary et al. .............. 360/126 |
| 5,838,521 A | | 11/1998 | Ravipati ...................... 360/319 |
| 5,843,521 A | | 12/1998 | Ju et al. ...................... 427/129 |
| 5,910,870 A | * | 6/1999 | Ishiwata ...................... 360/317 |
| 6,018,443 A | | 1/2000 | Watanabe et al. ............ 360/319 |
| 6,034,847 A | | 3/2000 | Komuro et al. .............. 360/126 |
| 6,197,439 B1 | * | 3/2001 | Parkin et al. ................ 428/678 |
| 6,233,116 B1 | * | 5/2001 | Chen et al. .................. 360/126 |
| 6,259,583 B1 | * | 7/2001 | Fontana et al. .............. 360/126 |
| 6,292,334 B1 | | 9/2001 | Koike et al. ................. 360/319 |
| 6,301,075 B1 | * | 10/2001 | Sato ............................ 360/126 |
| 6,327,121 B1 | | 12/2001 | Nagasawa et al. ..... 360/324.11 |
| 6,358,635 B1 | * | 3/2002 | Min et al. .................... 428/692 |
| 6,437,949 B1 | * | 8/2002 | Macken et al. .............. 360/319 |
| 6,496,335 B2 | * | 12/2002 | Gill ............................. 360/319 |
| 5,792,547 A * 8/1998 Liu et al. .................... 428/212 | | | |
| 6,628,478 B2 | * | 9/2003 | Gill ............................. 360/126 |

SINGLE DOMAIN STATE LAMINATED THIN FILM STRUCTURE FOR USE AS A MAGNETIC LAYER OF A TRANSDUCING HEAD

CROSS-REFERENCE TO RELATED APPLICATION(S)

This application is a continuation-in-part of U.S. patent application Ser. No. 09/649,984, filed on Aug. 29, 2000 entitled "Single Domain State Laminated Thin Film Structure" of Declan Macken and Gavin Brinkley, now U.S. Pat. No. 6,437,949, which claims priority benefit of provisional U.S. patent application Ser. No. 60/181,116, filed on Feb. 8, 2000 for "Strategy for Elimination of Domain Walls From the Shields of MR Sensors" of Declan Macken and Gavin Brinkley.

This application also claims priority from provisional U.S. patent application Ser. No. 60/353,674, filed on Jan. 31, 2002 for "Elimination of Domain Walls From the Poles of Perpendicular Writers" of Declan Macken, Gavin Brinkley, Taras Grigoryevich Pokhil, Alexander Mikhailovich Shukh, and Martin Louis Plumer.

BACKGROUND OF THE INVENTION

The present invention relates generally to the field of electronic data storage and retrieval systems. In particular, the present invention relates to a novel lamination of materials which provides a single domain state shield for a magnetoresistive element of a transducing head and/or a single domain state pole of a perpendicular writer of a transducing head.

In an electronic data storage and retrieval system, a transducing head typically includes a writer for storing magnetically-encoded information on a magnetic disc and a reader for retrieving that magnetically-encoded information from the magnetic disc. The writer is formed of several layers, including at least two magnetic layers that function as a writer core, or magnetic poles. The reader is also formed of several layers, including at least two magnetic layers that function as shields for a read element of the reader.

Within a typical shield of a reader exist a plurality of magnetic domains separated from each other by a plurality of magnetic domain walls. The shields of a reader exert stray magnetic fields on the read element. These stray fields are accounted for when the read element is biased. As the domain walls move, however, these stray magnetic fields change, thus changing the bias point of the read element, as well as the response of the read element to signals emanating from the rotating disc. The overall result is noise during the read operation.

To avoid the problems associated with domain wall movement, the ideal shield structure would have no domain walls. A reduction of domain wall density (or an elimination of domains) from magnetic thin film structures can be achieved by use of a lamination consisting of alternating ferromagnetic films and nonmagnetic spacer films. By equating the thickness·magnetic moment product of each of the ferromagnetic films, a coupling will occur between those films, providing an alternate flux closure path that prevents domain wall formation. Although such structures have greatly reduced demagnetization fields over unlaminated single layer structures, they often feature undesirable edge-closure walls. Additionally, these structures require a very high level of control over layer thicknesses.

Others have proposed that antiferromagnetic layers can be used to bias the shields of a reader, thus resulting in a controlled domain structure. Hard bias or antiferromagnetic layers may be exchange coupled to large sheet films of soft ferromagnetic layers to bias those sheet films into a saturated state. Achievement of a single domain state in the soft ferromagnetic film is dependent upon the exchange field and soft film thickness. The use of such a structure as a shield for a read element, however, is unfeasible since the demagnetization fields associated with structures of the requisite dimensions would be so large as to overcome any induced bias. This would result in a multi-domain structure.

Perpendicular writers currently are being pursued as an option for increasing a real bit density of magnetic media. One difficulty, however, with perpendicular writers is the existence of magnetic domains within a top pole of the writer. Even with no current flowing through a set of coils that wrap about the poles of the writer, remnant magnetic state domain configurations in a pole tip region of the writer top pole may produce stray magnetic fields sufficient to cause degradation of recorded data. Additionally, the temporal decay to a remnant state (after the write current is turned off) may cause a time-dependent erasure of data recorded on the media. Control of such domain structures in the writer top pole is believed to be crucial for the elimination of this remnant erasure.

Thus, a single domain state magnetic layer is needed for use as a shield of a reader and/or for a pole of a writer.

BRIEF SUMMARY OF THE INVENTION

A transducing head has an air bearing surface; a first, a second, and a third magnetic layer; a magnetoresistive sensor; and conductive coils. The second magnetic layer is substantially parallel to the first magnetic layer. The third magnetic layer is separated at the air bearing surface from the second magnetic layer by a gap and is connected to the second magnetic layer opposite the air bearing surface. The magnetoresistive sensor is positioned between the first and the second magnetic layers. The conductive coils are positioned at least in part between the second and the third magnetic layers.

At least one of the first, the second and the third magnetic layers is formed of a thin film structure having a first and a second ferromagnetic layer, a nonmagnetic spacer layer, and a bias layer. The spacer layer is positioned between the first and the second ferromagnetic layers. The bias layer is positioned adjacent the first ferromagnetic layer. The second ferromagnetic layer has a thickness-magnetic moment product substantially equal to a thickness-magnetic moment product of the first ferromagnetic layer. An easy axis of the second ferromagnetic layer is substantially parallel to an easy axis of the first ferromagnetic layer.

In an alternate embodiment of the present invention, at least one of the first, the second and the third magnetic layers is formed of a plurality of thin film structures as described above and a plurality of structure spacer layers interspersed between each of the plurality of thin film structures. In this alternate embodiment, the plurality of thin film structures is arranged to alternate the biased ferromagnetic layers and the unbiased ferromagnetic layers of the plurality of thin film structures.

DETAILED DESCRIPTION

Figure 1:
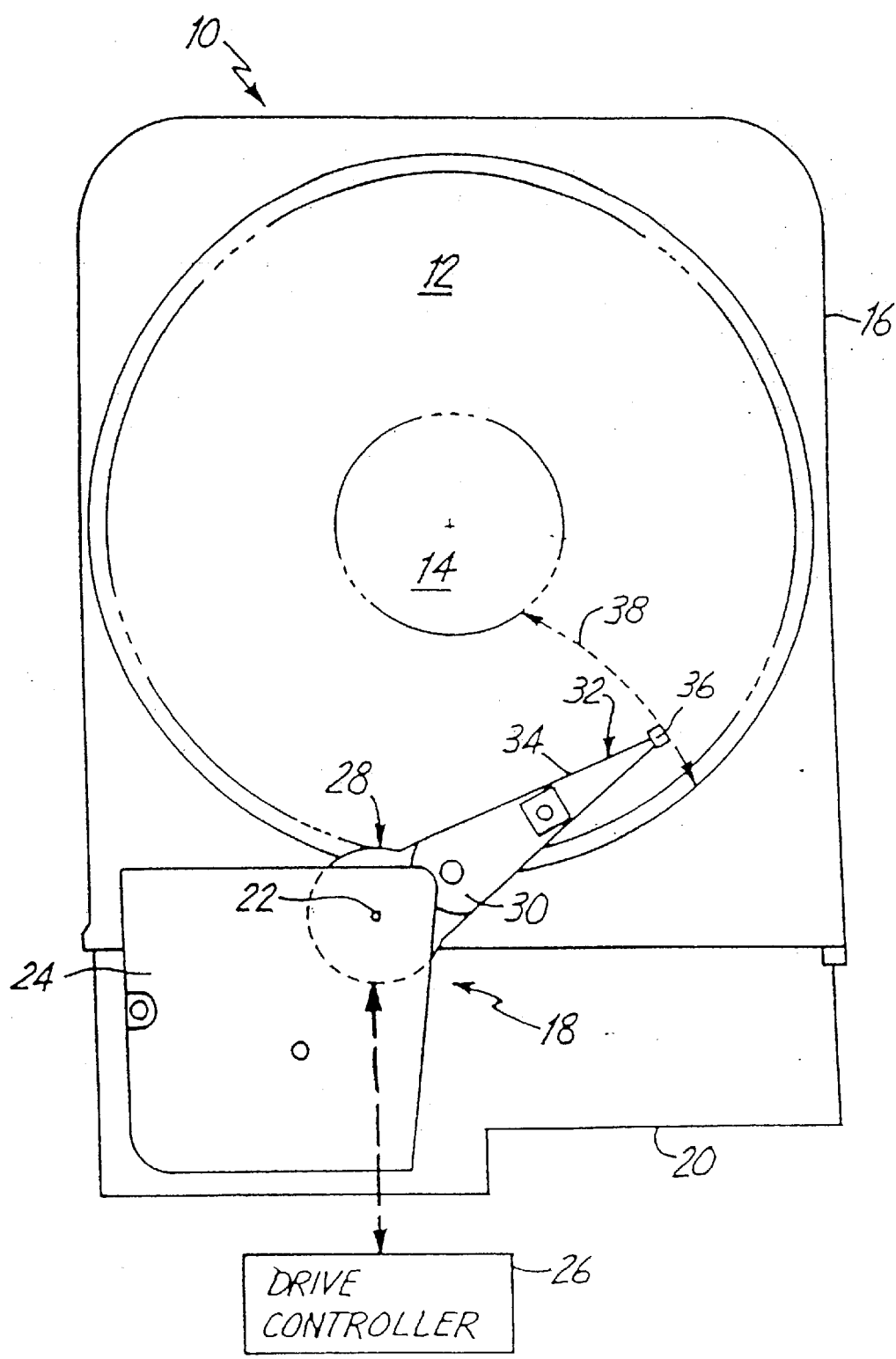
FIG. 1 is a top view of a disc drive system including a magnetoresistive read head in accord with the present invention.

FIG. 1 is a top view of disc drive system 10 including a magnetoresistive (MR) read head in accord with the present invention. Disc drive system 10 includes magnetic disc 12 mounted for rotational movement about an axis defined by spindle 14 within housing 16. Disc drive 10 also includes actuator 18 mounted to base plate 20 of housing 16 and pivotally movable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes actuator arm assembly 28, a rigid support member 30, and head gimbal assembly 32. Head gimbal assembly 32 includes flexure arm 34 coupled to rigid member 30 and air bearing slider 36 coupled to flexure arm 34 by a gimbal. Slider 36 supports a magnetoresistive transducer or head for reading information from disc 12 and encoding information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of disc 12 in a generally arc-like path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
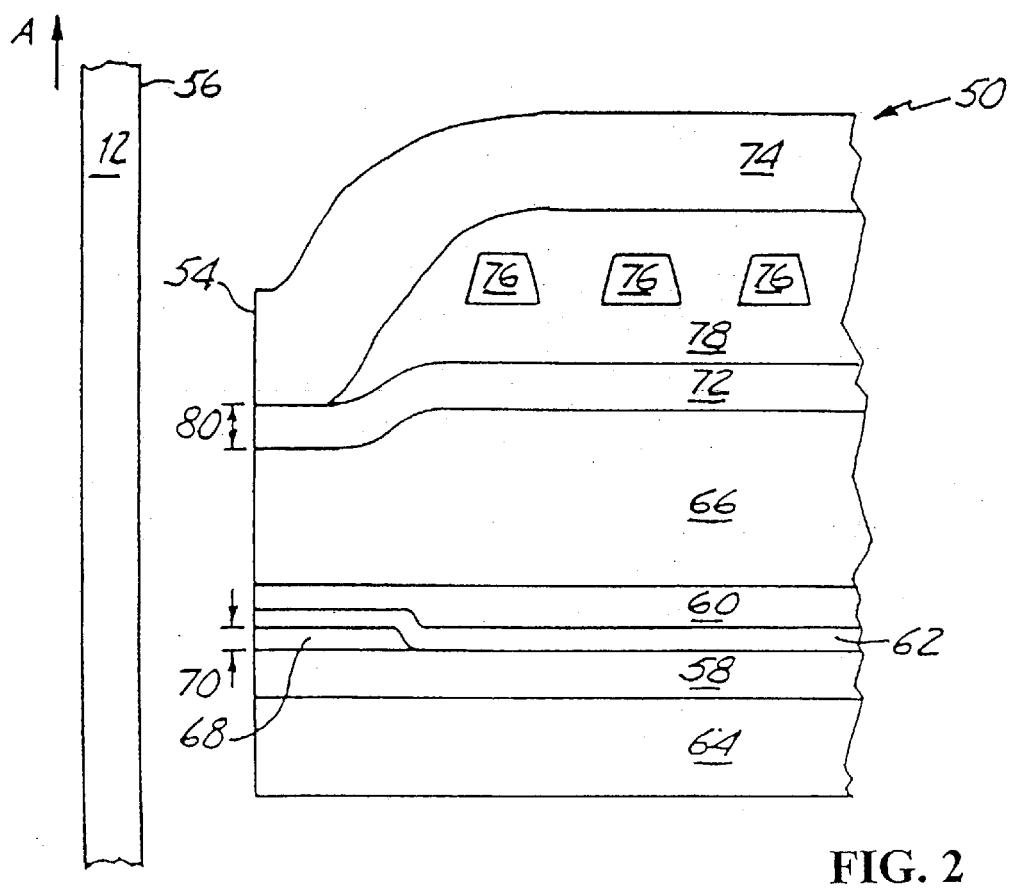
FIG. 2 is a cross-sectional view of a magnetic transducing head and a magnetic disc taken along a plane normal to an air bearing surface of the transducing head.

FIG. 2 is a cross-sectional view of magnetic transducing head 50 and magnetic disc 12 taken along a plane normal to air bearing surface 54 of read/write head 50. It should be understood that while FIG. 2 illustrates the overall structure of transducing head 50, the actual dimensions of individual elements of transducing head 50 are not shown to scale.

Air bearing surface 54 of magnetic transducing head 50 faces disc surface 56 of magnetic disc 12. Magnetic disc 12 travels or rotates in a direction relative to magnetic transducing head 50 as indicated by arrow A. The spacing between air bearing surface 54 and disc surface 56 is preferably minimized while avoiding contact between magnetic transducing head 50 and magnetic disc 12. In most cases, contact between magnetic transducing head 50 and magnetic disc 12 would damage both magnetic transducing head 50 and magnetic disc 12.

A reader portion of transducing head 50 includes bottom gap layer 58, top gap layer 60, metal contact layer 62, first magnetic layer 64, second magnetic layer 66, and read element 68. Read gap 70 is defined on air bearing surface 54 between terminating ends of bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62. First and second magnetic layers 64 and 66 function as shields for read element 68.

A writer portion of magnetic transducing head 50 includes second magnetic layer 66, write gap layer 72, third magnetic layer 74, conductive coil 76, and polymer layer 78. Write gap 80 is defined on air bearing surface 54 by write gap layer 72 between terminating ends of third magnetic layer 74 and second magnetic layer 66. Electrically conductive coils 76 are provided to generate magnetic fields across write gap 80 and are positioned in polymer layer 78 between third magnetic layer 74 and write gap layer 72. While FIG. 2 shows a single layer of conductive coils 76, it is understood in the art that several layers of conductive coils separated by several polymer layers may be used. Second and third magnetic layers 66 and 74 function as poles of the writer portion of transducing head 50.

Transducing head 50 is a merged MR head in which second magnetic layer 66 is employed both as a top shield in the reader portion and as a bottom pole in the writer portion. Transducing head 50 may also be arranged as a piggyback MR head, in which second magnetic layer 66 is formed of two separate magnetic layers.

Figure 3:
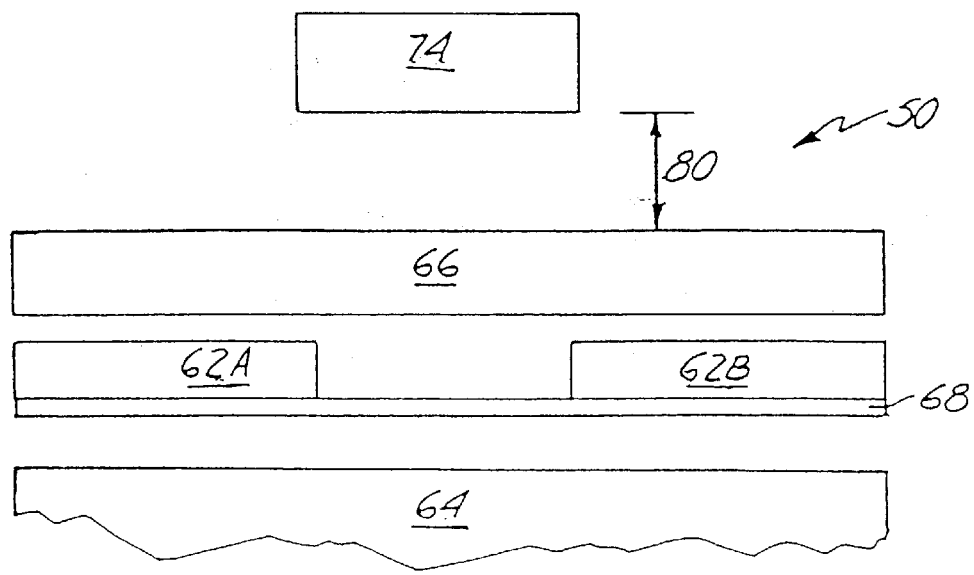
FIG. 3 is a layered diagram illustrating magnetically significant elements of the magnetic transducing head of FIG. 2.

FIG. 3 is a layered diagram of magnetic transducing head 50, illustrating the location of a plurality of magnetically significant elements of magnetic transducing head 50 as they appear along air bearing surface 54 of magnetic read/write head 50 shown in FIG. 2. In FIG. 3, all spacing and insulating layers are omitted for clarity. First and second magnetic layers 64 and 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a MR element or a giant magnetoresistive (GMR) stack. A MR element is generally formed of a ferromagnetic material whose resistance fluctuates in response to an external magnetic field, preferably from a magnetic medium or disc. GMR sensors have a series of alternating magnetic and nonmagnetic layers. The resistance of a GMR sensor varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers of a SV sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer.

As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

During a read operation, first and second magnetic layers 64 and 66 act as shields to ensure that read element 68 reads only the information stored directly beneath it on a specific track of magnetic disc 12 by absorbing any stray magnetic fields emanating from adjacent tracks and transitions.

Within a typical shield exists a plurality of magnetic domains separated from each other by a plurality of magnetic domain walls. Each domain has a magnetization that is oriented in a direction different than the magnetization of all adjacent domains. The application of an external magnetic field, either during manufacture or from an adjacent track or transition of the magnetic storage medium during operation, to first or second magnetic layers 64 or 66 can cause the magnetization of each of the domains within the layer to rotate, thereby causing the domains to move. Because of the random nature of the domain wall location, the domain walls generally do not return to their original location after the external magnetic field is removed.

First and second magnetic layers 64 and 66 exert stray magnetic fields on the MR sensor. These stray fields are accounted for when the MR sensor is biased. As the domain walls move, however, these stray magnetic fields change, thus changing the bias point of the MR sensor, as well as the response of the MR sensor to signals emanating from the rotating disc. The overall result is noise during the read operation.

The writer portion of transducing head 50 can be arranged as either a longitudinal writer or a perpendicular writer. In either case, the general structure of the writer is similar, although the actual dimensions of its elements will differ. In a longitudinal writer, second and third magnetic layers 66 and 74 are commonly referred to as a bottom pole and a top pole, respectively, while in a perpendicular writer, the second and third magnetic layers 66 and 74 are commonly referred to as a return pole and a top pole, respectively.

To write data to a longitudinal magnetic media, a time-varying electrical current, or write current, is caused to flow through conductive coil 76. The write current produces a time-varying magnetic field through second and third magnetic layers 66 and 74 that bridges write gap 80 between second magnetic layer 66 and third magnetic layer 74 at the air bearing surface of transducing head 50. The longitudinal magnetic media is passed over the air bearing surface of transducing head 50 at a predetermined distance such that the magnetic surface of the media passes through the magnetic field. As the write current changes, the magnetic field changes in intensity and direction. This type of writer is referred to as a longitudinal writer because the generated magnetic field causes bits to be written to the magnetic media in the plane of the magnetic media.

A perpendicular magnetic media differs from a longitudinal magnetic media in the direction in which the magnetization in the recording surface is held. For a longitudinal media, the magnetization is held in a direction substantially parallel to the surface of the media, while for a perpendicular media, the magnetization is held in a direction substantially normal to the surface of the media. To enable data to be perpendicularly recorded, perpendicular media generally are formed of two layers: a soft magnetic underlayer having high permeability and a media layer having high perpendicular anisotropy.

To write data to the perpendicular magnetic media, a time-varying write current is caused to flow through conductive coil 76, which in turn produces a time-varying magnetic field through second and third magnetic layers 66 and 74, which act magnetic poles. The magnetic media is then passed over the air bearing surface of the writer at a predetermined distance such that the media passes through the magnetic field. With a perpendicular writer, second and third magnetic layers 66 and 74 are spaced further apart than in the longitudinal writer, and the underlayer of the magnetic media in essence acts as a third pole of the writer; that is, the magnetic field bridges the gap from third magnetic layer 74 to the underlayer, passing through the media layer, and then subsequently bridges the gap between the underlayer and second magnetic layer 66, again passing through the media layer. To ensure that the magnetic field does not write data on this return path, second magnetic pole 66 is substantially larger than third magnetic pole 74 at the air bearing surface such that the magnetic field through the media layer will not be concentrated sufficiently to overcome the intrinsic magnetization of the media.

Perpendicular writers currently are being pursued as an option for increasing a real bit density of magnetic media. One difficulty, however, with perpendicular writers is the existence of magnetic domains within third magnetic layer 74. Even with no current flowing through conductive coil 76, remnant magnetic state domain configurations in a pole tip region of the writer may produce stray magnetic fields sufficient to cause degradation of recorded data. Additionally, the temporal decay to a remnant state (after the write current is turned off) may cause a time-dependent erasure of data recorded on the media. Control of such domain structures in third magnetic layer 74 is believed to be crucial for the elimination of this remnant erasure.

To avoid the problems associated with domain wall movement, the ideal magnetic layer of a transducing head would have no domain walls. The present invention achieves a single magnetic domain state in a magnetic pole and/or a magnetic shield by forming the pole and/or shield of a novel lamination of materials.

Figure 4:
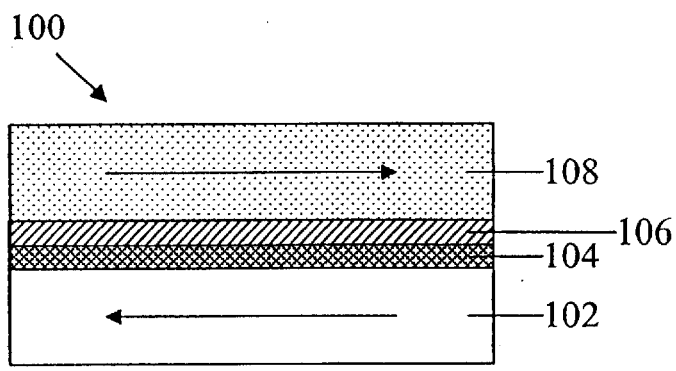
FIG. 4–FIG. 11 are layer diagrams of shields formed of novel laminations of materials in accord with the present invention.

FIG. 4 is a layer diagram of magnetic layer 100 formed of a novel lamination of materials in accord with the present invention. Magnetic layer 100 is particularly useful as a magnetic pole and/or a shield of a transducing head, and thus may be used as any of first, second, or third magnetic layers 64, 66, or 74 of transducing head 50. Magnetic layer 100 is formed of unbiased layer 102, spacer layer 104, biasing layer 106 and biased layer 108.

Each of unbiased layer 102 and biased layer 108 is preferably formed of a soft ferromagnetic material having anisotropic properties, such as NiFe, a cobalt amorphous alloy, FeN, permalloy or sendust. In a preferred embodiment, a product of a thickness of unbiased layer 102 and a magnetic moment of unbiased layer 102 preferably equals a product of a thickness of biased layer 108 and a magnetic moment of biased layer 108, and an easy axis of unbiased layer 102 is preferably parallel to an easy axis of biased layer 108.

Biasing layer 106 is placed adjacent to biased layer 108, such that biasing layer 106 is positioned between spacer layer 104 and biased layer 108. Biasing layer 106 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. Biasing layer 106 is exchange coupled with biased layer 108 to bias, or set, a magnetization of biased layer 108 along the easy axis of biased layer 108.

Spacer layer 104 is preferably a pinhole free thin (approximately 300 Å) layer of a nonmagnetic material, such as tantalum, alumina, silica, copper, gold or silver. Nonmagnetic spacer 104, which is positioned between unbiased layer 102 and biasing layer 106 prevents exchange coupling between unbiased layer 102 and biasing layer 106. Thus, a magnetization of unbiased layer 102 is oriented antiparallel to the magnetization of biased layer 108 due to demagnetization fields from biased layer 108.

Nonmagnetic spacer 104 has a dramatic effect on reducing demagnetization fields within magnetic layer 100, thereby allowing magnetic layer 100 to operate in a single magnetic domain state. Furthermore, this multi-layer lamination of magnetic layer 100 allows for the magnetizations of unbiased layer 102 and biased layer 108 to each be saturated along respective easy axes while leaving virtually unaffected the coherent rotation of magnetizations of the hard axes of respective unbiased layer 102 and biased layer 108. This feature is very important for magnetic shield applications since the shield must be allowed to absorb stray magnetic flux from adjacent bits or tracks on the magnetic disc by a process of coherent rotation.

Figure 5:
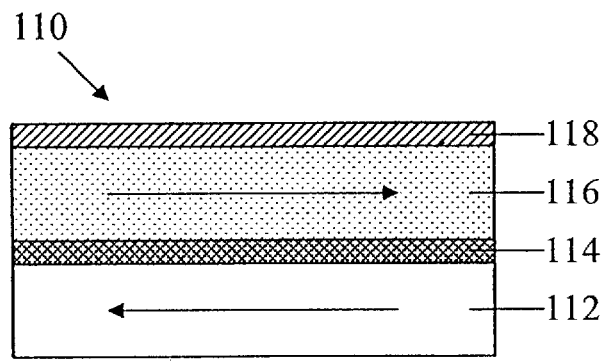

FIG. 5 is a layer diagram of magnetic layer 110 formed of a novel lamination of materials in accord with the present invention. Magnetic layer 110 is particularly useful as a magnetic pole and/or a shield of a transducing head, and thus may be used as any of first, second, or third magnetic layers 64, 66, or 74 of transducing head 50. Magnetic layer 110 is formed of unbiased layer 112, spacer layer 114, biased layer 116 and biasing layer 118. Magnetic layer 110 is identical to magnetic layer 100 of FIG. 4, except that locations of biased layer 116 and biasing layer 118 of magnetic layer 110 are reversed from locations of biasing layers 106 and biased layer 108 of magnetic layer 100. Otherwise, each layer of magnetic layer 110 is identical to the respective layer of magnetic layer 100.

Each of unbiased layer 112 and biased layer 116 is preferably formed of a soft ferromagnetic material having anisotropic properties, such as NiFe, a cobalt amorphous alloy, FeN, permalloy or sendust. In a preferred embodiment, a product of a thickness of unbiased layer 112 and a magnetic moment of unbiased layer 112 preferably equals a product of a thickness of biased layer 116 and a magnetic moment of biased layer 116, and an easy axis of unbiased layer 112 is preferably parallel to an easy axis of biased layer 116.

Biasing layer 118 is placed adjacent to biased layer 116, such that biased layer 116 is positioned between spacer layer 114 and biasing layer 118. Biasing layer 118 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. Biasing layer 118 is exchange coupled to biased layer 116 to bias, or set, a magnetization of biased layer 116 along the easy axis of biased layer 116.

Nonmagnetic spacer layer 114 is preferably a pinhole free thin (approximately 300 Å) layer of a nonmagnetic material, such as tantalum, alumina, silica, copper, gold or silver. Nonmagnetic spacer layer 114, which is positioned between unbiased layer 112 and biased layer 116 prevents exchange coupling between unbiased layer 112 and biased layer 116. Thus, a magnetization of unbiased layer 112 is oriented antiparallel to the magnetization of biased layer 116 due to demagnetization fields from biased layer 116.

As with magnetic layer 100, nonmagnetic spacer 114 has a dramatic effect on reducing demagnetization fields within magnetic layer 110, thereby allowing magnetic layer 110 to operate in a single magnetic domain state. Furthermore, this multi-layer lamination of magnetic layer 110 allows for the magnetizations of unbiased layer 112 and biased layer 116 to each be saturated along respective easy axes while leaving virtually unaffected the coherent rotation of magnetizations of on the hard axes of respective unbiased layer 112 and biased layer 116. This feature is very important for magnetic shield applications since the shield must be allowed to absorb stray magnetic flux from adjacent bits or tracks on the magnetic disc by a process of coherent rotation.

Figure 6:
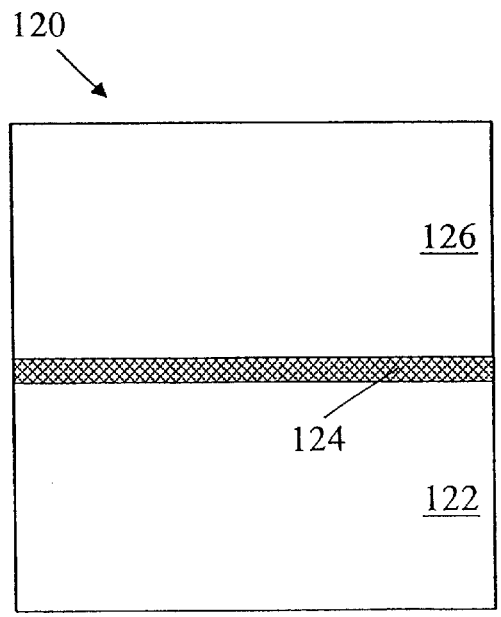

FIG. 6 is a layer diagram of magnetic layer 120 formed of a novel lamination of materials in accord with the present invention. Magnetic layer 120 is particularly useful as a magnetic pole and/or a shield of a transducing head, and thus may be used as any of first, second, or third magnetic layers 64, 66, or 74 of transducing head 50. Magnetic layer 120 is formed of first structure 122, second structure 126, and structure spacer layer 124 positioned between first and second structures 122 and 126. Each of first and second structures 122 and 126 is preferably formed of a structure similar to that of either magnetic layer 100 or 110.

Figure 7:
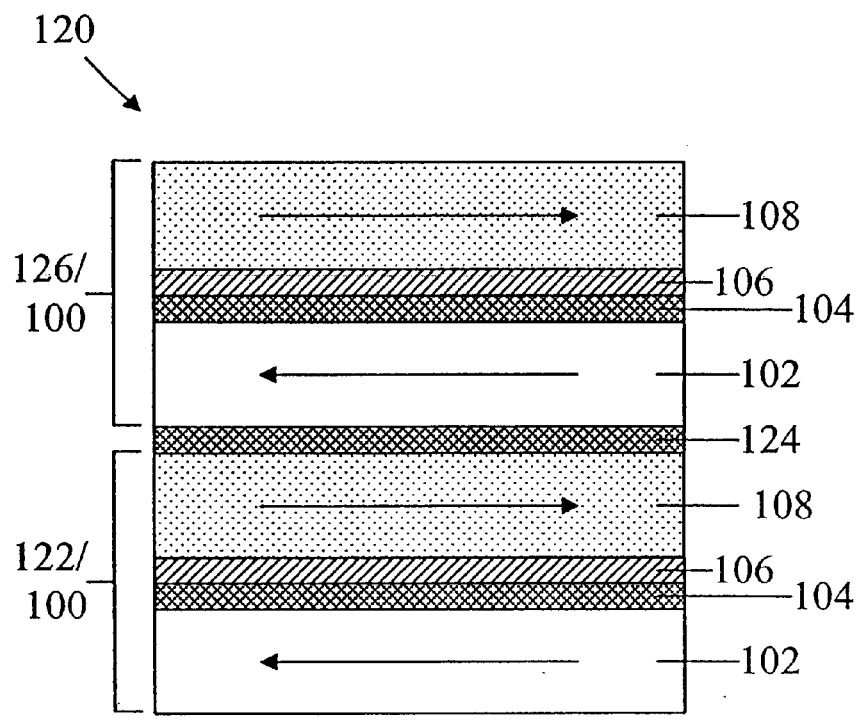
Figure 8:
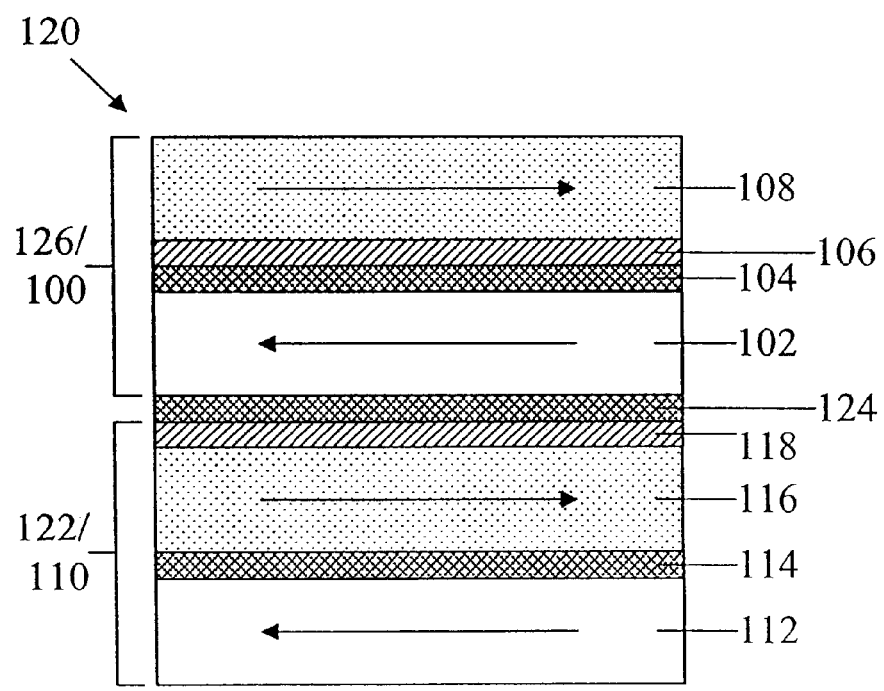

FIGS. 7 and 8 are each examples of magnetic layer 120 of FIG. 6. As shown in FIG. 7, each of first and second structures 122 and 126 of magnetic layer 120 has been formed of a structure similar to that of magnetic layer 100. In the example of FIG. 8, first structure 122 has been formed of a structure similar to that of magnetic layer 110, while second structure 126 has been formed of a structure similar to that of magnetic layer 100. When combining two structures to form magnetic layer 120, the unbiased and biased layers must be alternated to ensure that the magnetizations of ferromagnetic layers are antiparallel, thereby minimizing the overall demagnetization fields within magnetic layer 120. Thus, in the example of FIG. 7, biased layer 108 of first structure 122 is positioned between unbiased layers 102 of first and second structures 122 and 126, and unbiased layer 102 of second structure 126 is positioned between biased layers 108 of first and second structures 122 and 126. Similarly in the example of FIG. 8, biased layer 116 of first structure 122 is positioned between unbiased layer 112 of first structure 122 and unbiased layer 102 of second structure 126, while unbiased layer 102 is positioned between biased layer 116 of first structure 122 and biased layer 108 of second structure 126.

To build an even thicker magnetic layer, additional structures, separated by structure spacer layers, can be added to magnetic layer 120 of FIG. 6. A magnetic layer of the present invention can be built from any of a plurality of thin film structures as illustrated in FIGS. 4 and 5 and a plurality of structure spacer layers interspersed between each of the thin film structures. As with the two structure embodiment of FIG. 6, the plurality of structures must be arranged to alternate the unbiased and biased ferromagnetic layers to minimize the demagnetization fields within the final magnetic layer structure. Importantly, in such a multi-structure stack, the bias layers of each individual structure need not exclusively be formed of a permanent magnet material or an antiferromagnetic material, but may be a combination of both.

Figure 9:
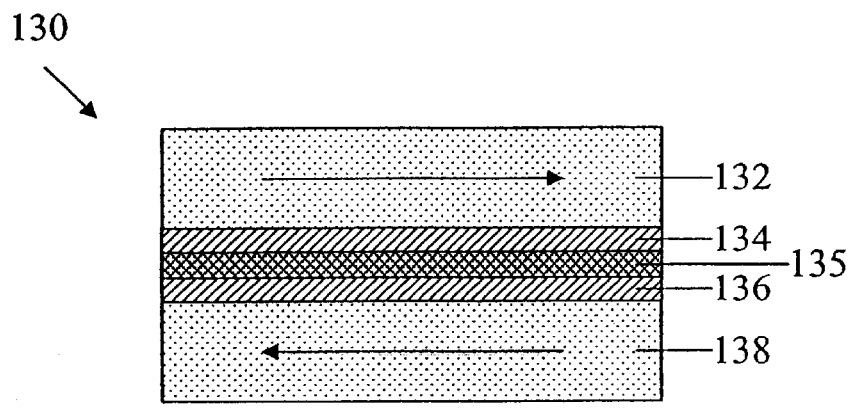

FIG. 9 is a layer diagram of magnetic layer 130 formed of a novel lamination of materials in accord with the present invention. Magnetic layer 130 is particularly useful as a magnetic pole and/or a shield of a transducing head, and thus may be used as any of first, second, or third magnetic layers 64, 66, or 74 of transducing head 50. Rather than being formed of an unbiased layer and a biased layer, magnetic layer 130 is formed of two biased layers separated by a spacer. Magnetic layer 130 is formed of first biased layer 132, first biasing layer 134, spacer layer 135, second biasing layer 136 and second biased layer 138.

Each of first and second biased layers 132 and 138 is preferably formed of a soft ferromagnetic material having anisotropic properties, such as NiFe, a cobalt amorphous alloy, FeN, permalloy or sendust. In a preferred embodiment, a product of a thickness of first biased layer 132 and a magnetic moment of first biased layer 132 preferably equals a thickness of second biased layer 138 and a magnetic moment of biased layer 138, and an easy axis of first biased layer 132 is preferably parallel to an easy axis of second biased layer 138.

First biasing layer 134 is placed adjacent to first biased layer 132, such that first biasing layer 134 is positioned between first biased layer 132 and spacer layer 135. Second biasing layer 136 is positioned adjacent second biased layer 138, such that second biasing layer 136 is positioned between spacer layer 135 and second biased layer 138. Each of first and second biasing layers 134 and 136 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. First and second biasing layers 134 and 136 are exchange coupled with respective first and second biased layers 132 and 138 to bias, or set, a magnetization of first and second biased layer 132 and 138 along the easy axes of first and second biased layer 136 and 138. Preferably a magnetization of biased layer 132 is set in a direction antiparallel to a magnetization of biased layer 138.

Spacer layer 135 is preferably a pinhole free thin (approximately 300 Å) layer of a nonmagnetic material, such as tantalum, alumina, silica, copper, gold or silver. Nonmagnetic spacer 135, which is positioned between first biasing layer 134 and second biasing layer 136 prevents exchange coupling between first biased layer 132 and second biased layer 138.

Figure 10:
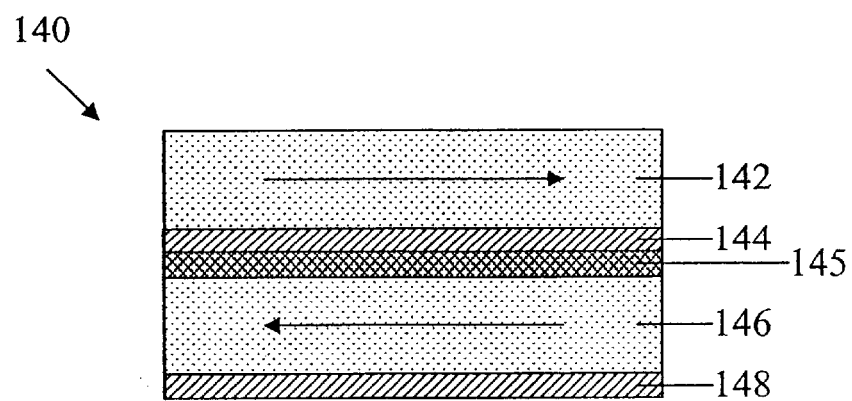

FIG. 10 is a layer diagram of magnetic layer 140 formed of a novel lamination of materials in accord with the present invention. Magnetic layer 140 is particularly useful as a magnetic pole and/or a shield of a transducing head, and thus may be used as any of first, second, or third magnetic layers 64, 66, or 74 of transducing head 50. Similar to magnetic layer 130 of FIG. 9, magnetic layer 140 is formed of first biased layer 142, first biasing layer 144, spacer layer 145, second biased layer 146 and second biasing layer 148. Each of first and second biased layers 142 and 146 is preferably formed of a soft ferromagnetic material having anisotropic properties, such as NiFe, a cobalt amorphous alloy, FeN, permalloy or sendust. In a preferred embodiment, a product of a thickness of first biased layer 142 and a magnetic moment of first biased layer 142 preferably equals a product of a thickness of second biased layer 146 and a magnetic moment of first biased layer 142, and an easy axis of first biased layer 142 is preferably parallel to an easy axis of second biased layer 146.

First biasing layer 144 is placed adjacent to first biased layer 142, such that first biasing layer 144 is positioned between first biased layer 142 and spacer layer 145. Second biasing layer 148 is positioned adjacent second biased layer 146, such that second biased layer 146 is positioned between spacer layer 145 and second biasing layer 148. Each of first and second biasing layers 144 and 148 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. First and second biasing layers 144 and 148 are exchange coupled with respective first and second biased layers 142 and 146 to bias, or set, a magnetization of first and second biased layer 142 and 146 along the easy axes of first and second biased layer 144 and 148. Preferably a magnetization of biased layer 142 is set in a direction antiparallel to a magnetization of biased layer 146.

Spacer layer 145 is preferably a pinhole free thin (approximately 300 Å) layer of a nonmagnetic material, such as tantalum, alumina, silica, copper, gold or silver. Nonmagnetic spacer 145, which is positioned between first biasing layer 144 and second biased layer 146 prevents exchange coupling between first biased layer 142 and second biased layer 146.

Figure 11:
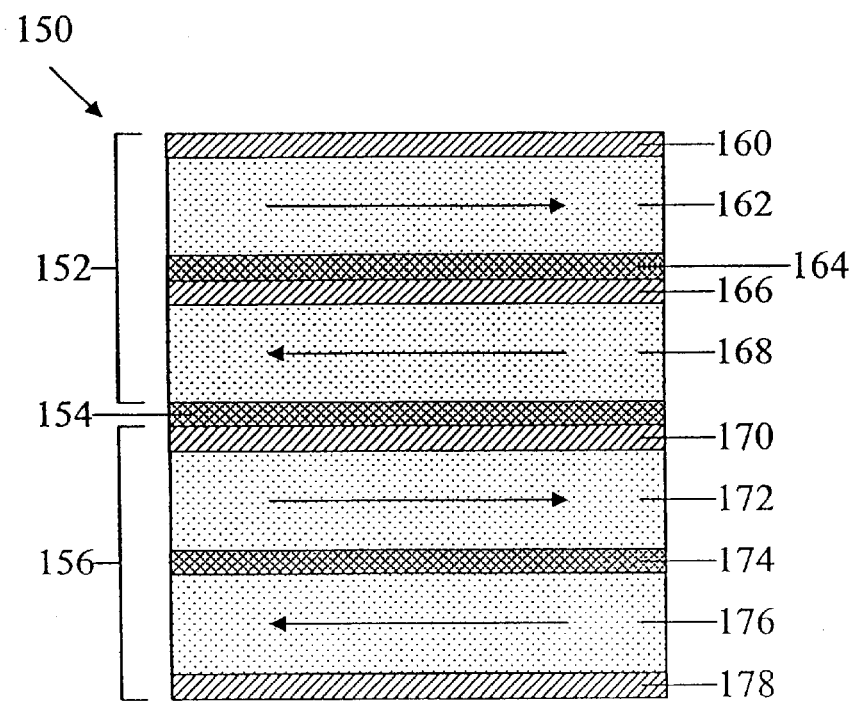

FIG. 11 is a layer diagram of magnetic layer 150 formed of a novel lamination of materials in accord with the present invention. Magnetic layer 150 is particularly useful as a magnetic pole and/or a shield of a transducing head, and thus may be used as any of first, second, or third magnetic layers 64, 66, or 74 of transducing head 50. Magnetic layer 150 is formed of first structure 152, second structure 156, and structure spacer layer 154 positioned between first and second structures 152 and 156. Each of first and second structures 152 and 156 is preferably formed of a structure similar to that of magnetic layer 100, magnetic layer 110, magnetic layer 130, magnetic layer 140 or a similar structure. As shown in FIG. 11, structure 152 is formed of first biasing layer 160, first biased layer 162, spacer layer 164, second biasing layer 166 and second biased layer 168 and second structure 156 is formed of first biasing layer 170, first biased layer 172, spacer layer 174, second biased layer 176 and second biasing layer 178.

Within first structure 152, spacer layer 164 is positioned between first and second biased layers 162 and 168, first biased layer 162 is positioned between first biasing layer 160 and spacer layer 164 and second biasing layer 166 is positioned between spacer layer 164 and second biased layer 168. Within second structure 156, spacer layer 174 is positioned between first and second biased layers 172 and 176, first biased layer 172 is positioned between first biasing layer 170 and spacer layer 174 and second biased layer 176 is positioned between spacer layer 174 and second biasing layer 178. Each layer of magnetic layer 150 has properties similar to those described above with reference to magnetic layers 130 and 140.

When combining two structures to form magnetic layer 150, the magnetization of each of the biased layers must be alternated to ensure that the magnetizations of ferromagnetic layers are antiparallel, thereby minimizing the overall demagnetization fields within magnetic layer 150. Thus, in the example of FIG. 11, the magnetization of first biased layer 162 of first structure 152 is parallel to the magnetization of first biased layer 172 of second structure 156 and antiparallel to the magnetization of both second biased layer 168 of first structure 152 and second biased layer 176 of second structure 156.

To build an even thicker magnetic layer, additional structures, separated by structure spacer layers, can be added to magnetic layer 150 of FIG. 11. A magnetic layer of the present invention can be built from any of a plurality of thin film structures as illustrated in FIGS. 4, 5, 9 and 10 and a plurality of structure spacer layers interspersed between each of the thin film structures. As with the two structure embodiment of FIG. 11, the plurality of structures must be arranged to alternate the magnetizations of the biased ferromagnetic layers to minimize the demagnetization fields within the final magnetic layer structure. Importantly, in such a multi-structure stack, the bias layers of each individual structure need not exclusively be formed of a permanent magnet material or an antiferromagnetic material, but may be a combination of both.

Incorporated herein by reference are U.S. patent application Ser. No. 09/649,984, filed on Aug. 29, 2000, entitled "Single Domain State Laminated Thin Film Structure" and provisional U.S. patent application Ser. No. 60/181,116, filed on Feb. 8, 2000, entitled "Strategy for Elimination of Domain Walls From the Shields of MR Sensors", both of Declan Macken and Gavin Brinkley. Also incorporated herein by reference is provisional U.S. patent application Ser. No. 60/353,674, filed on Jan. 31, 2002, entitled "Elimination of Domain Walls From the Poles of Perpendicular Writers" of Declan Macken, Gavin Brinkley, Taras Grigoryevich Pokhil, Alexander Mikhailovich Shukh, and Martin Louis Plumer.

In conclusion, the present invention introduces a novel lamination of materials for use as a single domain state magnetic layer of a transducing head. The magnetic layer of the present invention avoids the problems associated with domain wall movement in either a magnetic pole of a writer or a magnetic shield of a reader.

Although the present invention has been described with reference to preferred embodiments, workers skilled in the art will recognize that changes may be made in form and detail without departing from the spirit and scope of the invention.

What is claimed is:

1. A perpendicular writer comprising:
    a top pole comprising:
        a first ferromagnetic layer;
        a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer;
        a nonmagnetic spacer layer positioned between the first and the second ferromagnetic layers; and
        a first bias layer positioned adjacent the first ferromagnetic layer;
    a return pole; and
    conductive coils positioned at least in part between the top pole and the return pole.

2. The perpendicular writer of claim 1 wherein the top pole further comprises a second bias layer positioned adjacent the second ferromagnetic layer.

3. The perpendicular writer of claim 1 wherein the top pole further comprises:
    a third ferromagnetic layer;
    a fourth ferromagnetic layer having a thickness-magnetic moment product substantially equal to a thickness-magnetic moment product of the third ferromagnetic layer, an easy axis of the fourth ferromagnetic layer being substantially parallel to an easy axis of the third ferromagnetic layer;
    a nonmagnetic spacer layer positioned between the third and the fourth ferromagnetic layers;
    a third bias layer positioned adjacent the third ferromagnetic layer; and
    a third nonmagnetic spacer layer positioned such that the first and the second ferromagnetic layers are on a side of the third spacer layer opposite the third and the fourth ferromagnetic layers.

4. The perpendicular writer of claim 3 wherein the top pole further comprises:
    a second bias layer positioned adjacent the second ferromagnetic layer; and
    a fourth bias layer positioned adjacent the fourth ferromagnetic layer.

5. A transducing head having an air bearing surface, the transducing head comprising:
    a first magnetic layer;
    a second magnetic layer substantially parallel to the first magnetic layer;
    a third magnetic layer separated at the air bearing surface from the second magnetic layer by a gap and connected to the second magnetic layer opposite the air bearing surface;
    a magnetoresistive sensor positioned between the first and the second magnetic layers; and
    conductive coils positioned at least in part between the second and the third magnetic layers;
    wherein at least one of the first, the second, and the third magnetic layers is formed of a thin film structure comprising:
        a first ferromagnetic layer;
        a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer;
        a nonmagnetic spacer layer positioned between the first ferromagnetic layer and the second ferromagnetic layer; and
        a first bias layer positioned adjacent the first ferromagnetic layer.

6. The transducing head of claim 5 wherein the first bias layer is formed of an antiferromagnetic material.

7. The transducing head of claim 5 wherein the first bias layer is formed of a permanent magnet material.

8. The transducing head of claim 5 wherein the at least one of the first, the second, and the third magnetic layers further comprises a second bias layer positioned adjacent the second ferromagnetic layer.

9. The transducing head of claim 8 wherein each of the first and the second bias layers is formed of a permanent magnet material.

10. The transducing head of claim 8 wherein one of the first and the second bias layers is formed of an antiferromagnetic material and the other of the first and the second bias layers is formed of a permanent magnet material.

11. The transducing head of claim 5 wherein the at least one of the first, the second, and the third magnetic layers further comprises:
- a third ferromagnetic layer;
- a fourth ferromagnetic layer having a thickness substantially equal to a thickness of the third ferromagnetic layer and an easy axis substantially parallel to an easy axis of the third ferromagnetic layer;
- a second spacer layer positioned between the third and the fourth ferromagnetic layers;
- a third bias layer positioned adjacent the third ferromagnetic layer; and
- a third spacer layer positioned such that the first and the second ferromagnetic layers are on a side of the third spacer layer opposite the third and the fourth ferromagnetic layers.

12. The transducing head of claim 11 wherein each of the first and the third bias layers is formed of an antiferromagnetic material.

13. The transducing head of claim 11 wherein each of the first and the third bias layers is formed of a permanent magnet material.

14. The transducing head of claim 11 wherein one of the first and the second bias layers is formed of an antiferromagnetic material and the other of the first and the second bias layers is formed of a permanent magnet material.

15. The transducing head of claim 11 wherein the at least one of the first, the second, and the third magnetic layers further comprises:
- a second bias layer positioned adjacent the second ferromagnetic layer; and
- a fourth bias layer positioned adjacent the fourth ferromagnetic layer.

16. The transducing head of claim 15 wherein at least one of the first, the second, the third, and the fourth bias layers is formed of an antiferromagnetic material.

17. The transducing head of claim 15 wherein at least one of the first, the second, the third, and the fourth bias layers is formed of a permanent magnet material.

18. A transducing head having an air bearing surface, the transducing head comprising:
- a first magnetic layer;
- a second magnetic layer substantially parallel to the first magnetic layer;
- a third magnetic layer separated at the air bearing surface from the second magnetic layer by a gap and in contact with the second magnetic layer opposite the air bearing surface;
- a magnetoresistive sensor positioned between the first and the second magnetic layers; and
- conductive coils positioned at least in part between the second and the third magnetic layers;
- wherein at least one of the first, the second, and the third magnetic layers comprises a plurality of thin film structures and a plurality of structure spacer layers interspersed between the plurality of thin film structures, wherein each of the plurality of thin film structures comprises:
  - a first ferromagnetic layer;
  - a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer;
  - a nonmagnetic spacer layer positioned between the first ferromagnetic layer and the second ferromagnetic layer; and
  - a first bias layer positioned adjacent the first ferromagnetic layer;
- wherein the plurality of thin film structures are arranged to alternate the first and second ferromagnetic layers.

19. In a transducing head having an air bearing surface and comprising: a bottom shield; a top shield; a read element positioned between the bottom shield and the top shield; a top pole separated at the air bearing surface from the top shield by a gap and in contact with the top shield opposite the air bearing surface; and conductive coils positioned at least in part between the top pole and the top shield; an improvement comprising the top pole being formed of a thin film structure comprising: a first ferromagnetic layer; a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer; a nonmagnetic spacer layer positioned between the first ferromagnetic layer and the second ferromagnetic layer; and a first bias layer positioned adjacent the first ferromagnetic layer.

20. The transducing head of claim 19 wherein at least one of the bottom and the top shields is formed of the thin film structure.

21. In a transducing head having an air bearing surface and comprising:
- a magnetoresistive sensor; and
- at least one magnetic layer spaced away from the magnetoresistive sensor;
- an improvement comprising the at least one magnetic layer being formed of a thin film structure comprising:
  - a first ferromagnetic layer;
  - a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer;
  - a nonmagnetic spacer layer positioned between the first ferromagnetic layer and the second ferromagnetic layer; and
  - a first bias layer positioned adjacent the first ferromagnetic layer.

* * * * *